April 12, 1960     R. B. PEALER     2,932,524
AUTOMATIC CHUCK
Filed June 20, 1958     5 Sheets-Sheet 1

INVENTOR.
Robert B. Pealer.
BY
Harness, Dickey & Pierce
ATTORNEYS.

April 12, 1960　　R. B. PEALER　　2,932,524
AUTOMATIC CHUCK

Filed June 20, 1958　　　　　　　　　　5 Sheets-Sheet 2

INVENTOR.
Robert B. Pealer
BY
Harness, Dickey & Pierce
ATTORNEYS

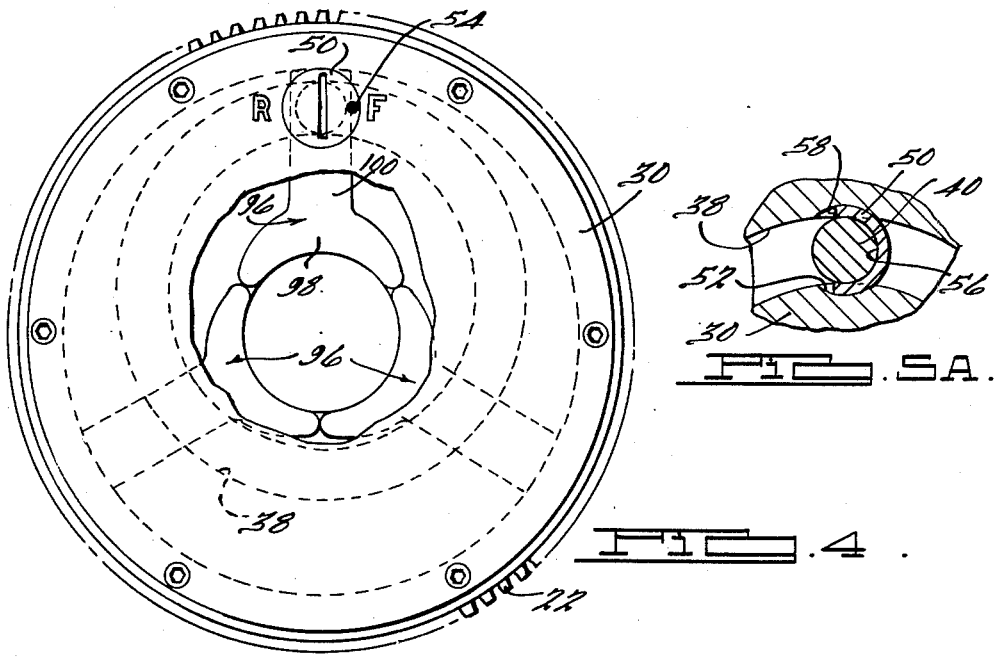
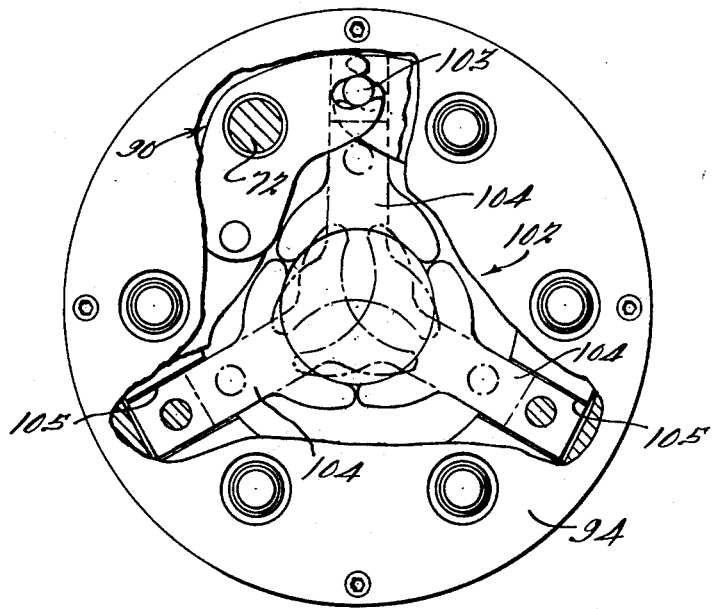

April 12, 1960 R. B. PEALER 2,932,524
AUTOMATIC CHUCK
Filed June 20, 1958 5 Sheets-Sheet 4

INVENTOR.
Robert B. Pealer.
BY
Harness, Dickey & Pierce.
ATTORNEYS.

April 12, 1960 R. B. PEALER 2,932,524
AUTOMATIC CHUCK
Filed June 20, 1958 5 Sheets-Sheet 5
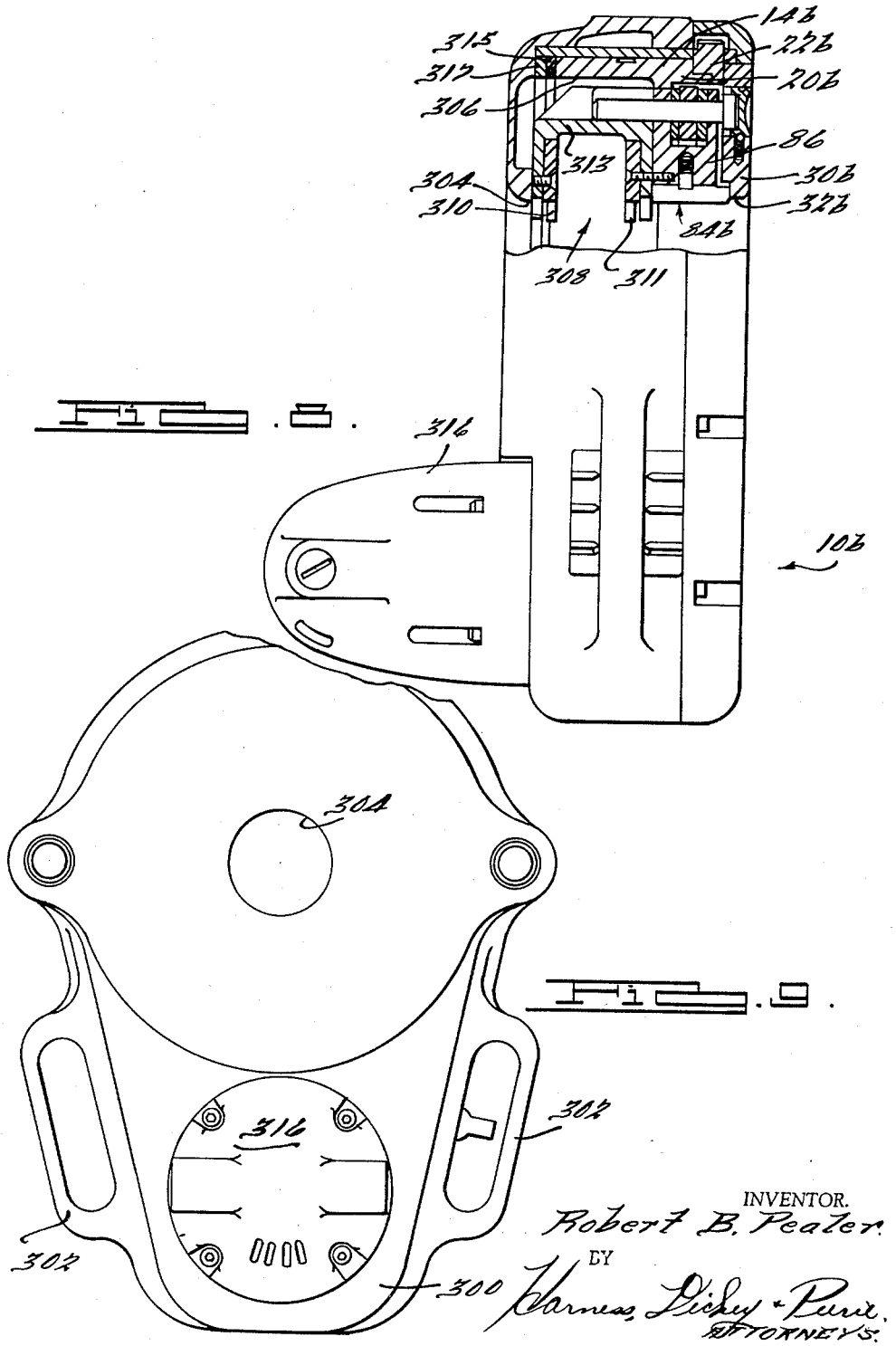
INVENTOR.
Robert B. Pealer.
BY
Harness, Dickey & Pierce.
ATTORNEYS.

United States Patent Office 2,932,524
Patented Apr. 12, 1960

2,932,524

AUTOMATIC CHUCK

Robert B. Pealer, Toledo, Ohio, assignor to The Toledo Pipe Threading Machine Co., a corporation of Ohio Application June 20, 1958, Serial No. 743,296

8 Claims. (Cl. 279—114)

This invention relates generally to chucks and more particularly to an improved chuck in which the jaws are automatically moved into a gripping relation with the work when the chuck is operated to rotate the work.

Chucks of the type to which this invention relates are used in machines such as pipe threaders, lathes and the like. Accordingly, a chuck which can be pre-assembled and then installed on a machine is desirable since there are a large number of possible markets. This invention provides a chuck which is pre-assembled, automatically centers a workpiece inserted in the chuck, is usable with a large range of workpiece sizes, has jaws which are continually urged inwardly during rotation of the chuck spindle so as to provide a continual jaw takeup, and which is of a construction such that even the smallest workpiece cannot become lodged between the chuck jaws.

The object of this invention, therefore, is to provide an improved chuck.

A further object of this invention is to provide an improved chuck which is simple in construction, economical to manufacture, and which is readily operated to grip and hold a workpiece inserted in the chuck.

Further objects, features and advantages of this invention will become apparent from a consideration of the following description, the appended claims and the accompanying drawing in which:

Fig. 4 is an elevational view of one end of the chuck of this invention, with some parts broken away to show the centering fork arrangement;

Fig. 5 is an elevational view of the opposite end of the chuck of this invention, with some parts broken away and other parts shown in section for the purpose of clarity, and showing inwardly moved positions of the workpiece centering forks in broken lines;

Fig. 5A is a transverse sectional view looking along the line 5A—5A in Fig. 1;

Fig. 8 is a side view of another modified form of the chuck of this invention; and Fig. 9 is an end view of the chuck shown in Fig. 8.

Figure 1:
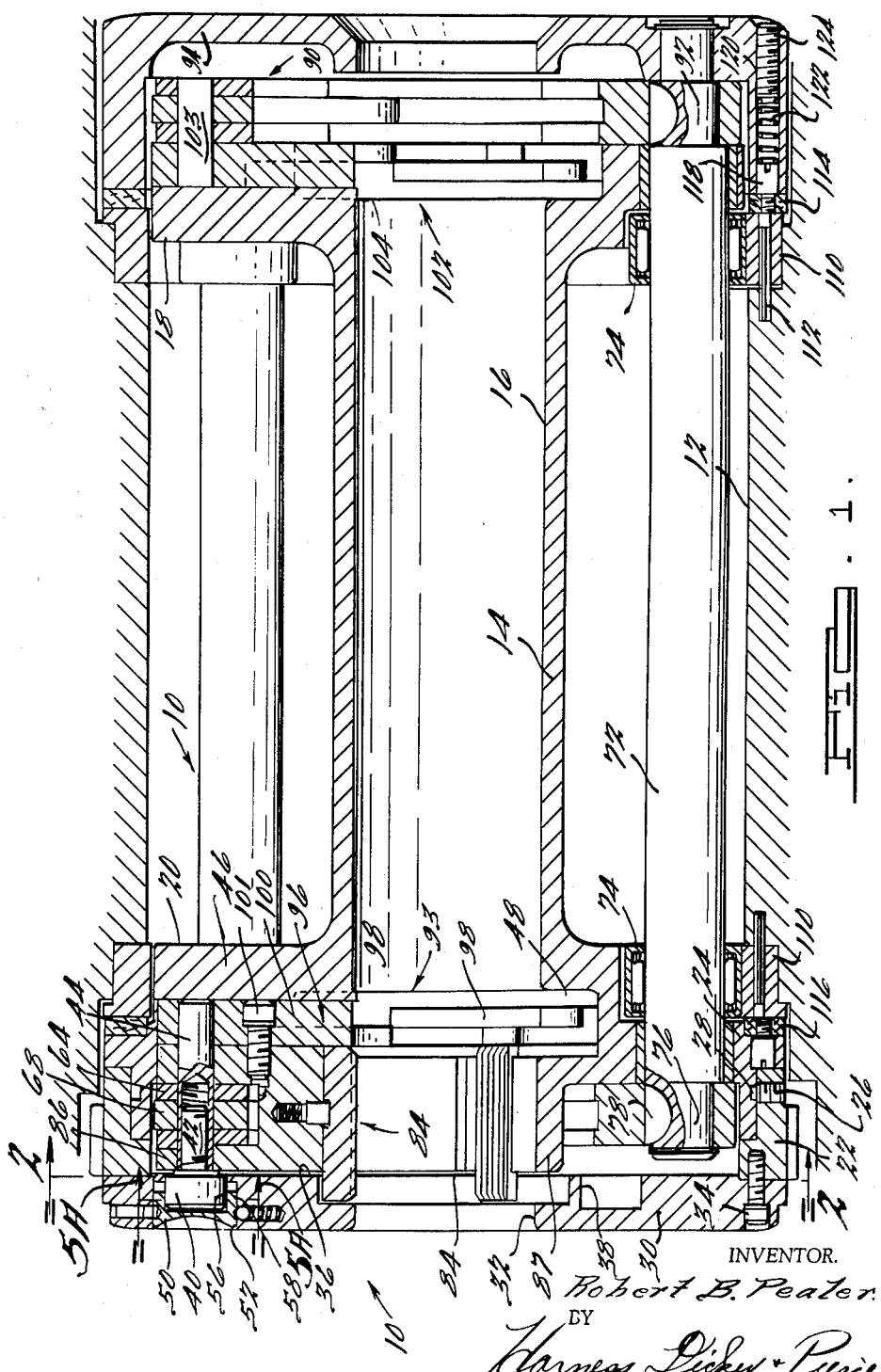
Figure 1 is a longitudinal sectional view of the chuck of this invention looking substantially along the line 1—1 in Fig. 2.

With reference to the drawing, the chuck of this invention, indicated generally at 10, is illustrated in Fig. 1 mounted in the head stock of a machine, such as a pipe threading machine which is illustrated diagrammatically at 12. The chuck 10 includes an elongated tubular spindle 14 having an axial bore 16 and enlarged rear and front end portions 18 and 20 which are substantially identical. A ring gear 22 rotatably supported on and extended about an annular section 24 of the front end portion 20 carries pins 26 which extend into an annular groove 28 for retaining the ring gear 22 in an assembled relation with the spindle end portion 20.

A cam plate 30, of a generally ring shape, has a central bore 32 which is aligned with the spindle bore 16 and is secured by cap screws 34 to the ring gear 22 at the front end of the chuck 10. In the side 36 of the cam plate 30 which faces the spindle end portion 20, an annular groove or track 38 is formed which is eccentric with respect to the longitudinal axis of the spindle bore 16 (Fig. 4).

A roller member 40 positioned in the track 38 has a shank or stem 42 (Fig. 1) which is threaded into one end of one of three pins 44 which are positioned in the end portion 20 at a location extending forwardly from an annular wall 46 formed on the spindle end portion 20 at the inner side of a groove 48 formed in the end portion 20.

An indicator disk 50 is mounted in an opening 52 located in the cam plate 30 so that it intersects the portion of the track 38 which is spaced furthest from the bore 32 (Figs. 1 and 4). The disk 50 is rotatable about its axis between positions in which a mark 54 thereon is opposite forward or reverse designations F and R on the cam plate 30. The inner side of the disk 50 has an axial cavity 56 in which the roller 40 is located. The cavity 56 is open on one side 58 (Fig. 5A) of the disk so that the roller 40 is movable in one direction out of the cavity 56 and this direction is determined by the forward or reverse position of the disk 50.

Figure 2:
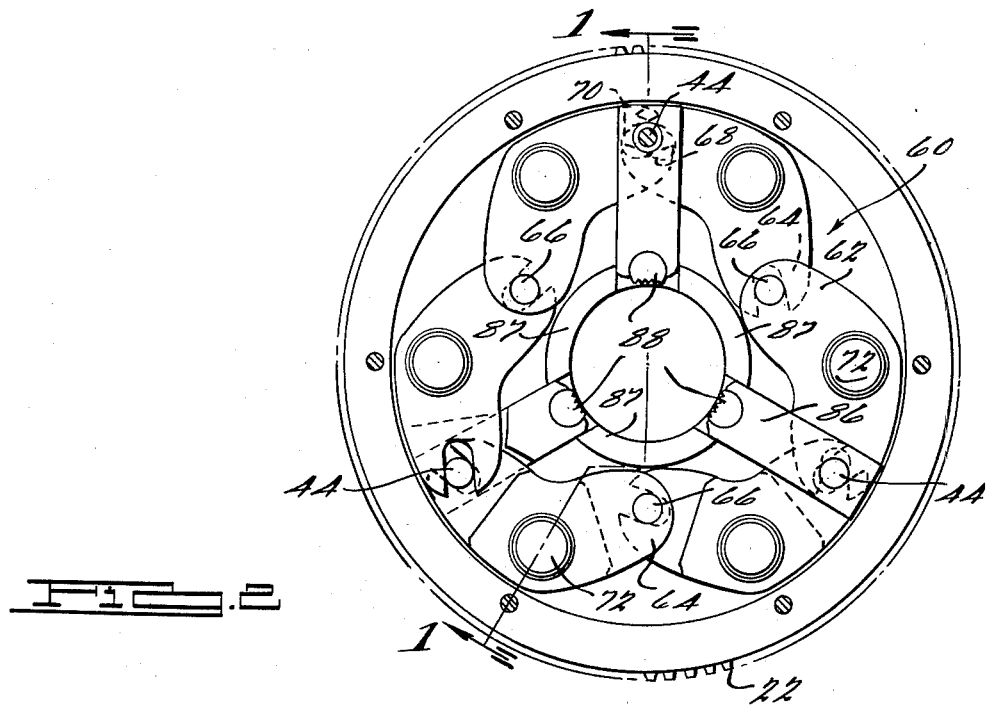
Fig. 2 is a transverse sectional view looking along the line 2—2 in Fig. 1, and showing the chuck jaws in their outermost moved positions.

Arranged within the spindle end portion 20 is a bellcrank assembly 60 (Fig. 2) consisting of six substantially identical bellcranks 62, each of which has one end 64 which is forked and carries a laterally extending pivot member and an opposite end 68 formed with a slot 70. The pivot members on three of the bellcranks are designated by the numeral 44, and one of these pivots has been described in connection with the mounting of the roller 40. The remaining three bellcranks 62, which are arranged so that they alternate with the first three carry pivot members designated 66. Each bellcrank 62 is mounted intermediate its ends 64 and 68 on an elongated shaft 72 which is parallel to the spindle bore 16 and is supported in bearings 74 mounted in the spindle end portions 18 and 20. Each of the bellcranks 62 is secured to one end 76 of the corresponding shaft 72 by a key 78 (Fig. 1) so that on rotation of a bellcranks 62, the corresponding shaft 72 is also rotated for a purpose to appear presently. The slot 70 at the end of each bellcrank 62 has the pivot member 44 or 66 at the adjacent end of the adjacent bellcrank 62 positioned therein so that rotation of one bellcrank causes all of the bellcranks to rotate.

The three pivot members 44 support jaw assemblies 84 which are slidably supported in the spindle 14 for movement radially thereof between guide flanges 87 formed on the spindle end portion 20. Each jaw assembly 84 includes a supporting block 86 which has an outer bifurcated end portion mounted on the pivot 44, at a position straddling the bellcrank end 64 which in turn straddles the end 68 of the adjacent bellcrank 62, and an inner end which carries a toothed jaw member 88.

Figure 3:
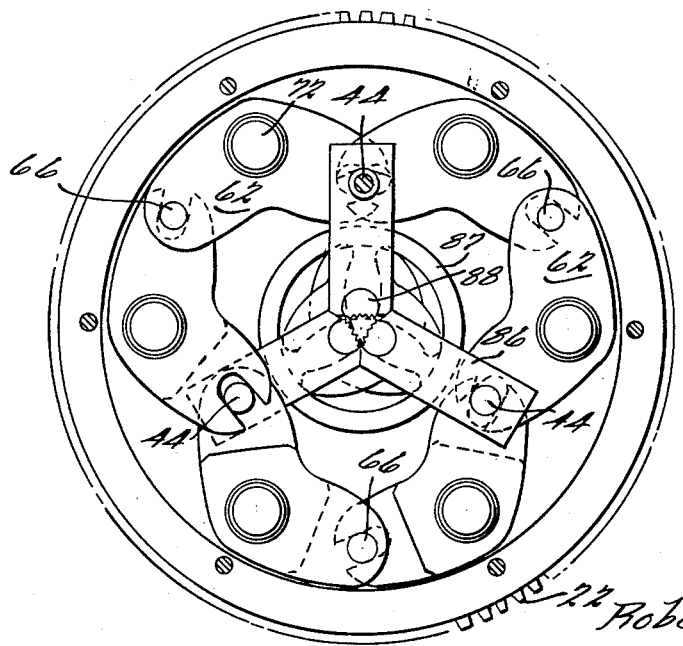
Fig. 3 is a transverse sectional view, illustrated similarly to Fig. 2 of the chuck of this invention showing the chuck jaws in their innermost moved positions.

With this arrangement of the bellcrank members 62, when one pivot member 44 is moved radially inwardly of the spindle 14, the bellcranks 62 are all rotated so that all of the pivot members 44 are moved inwardly of the spindle 14 by amounts corresponding to the inward movement of the first pivot member 44. Consequently, all of the jaw assemblies 84 are moved radially inwardly of the spindle 14 so that the toothed jaw members 88 swivelly mounted on the inner ends of the jaw blocks 86 engage a workpiece such as a pipe in the spindle 14. Movement of a pivot member 44 inwardly of the spindle 14 is obtained by relative movement of the roller 40 and the cam plate 30 so that the roller is moved along the eccentric track 38. As illustrated in Fig. 3, in which the jaw assemblies 84 are illustrated in their innermost positions, a pipe of an extremely small size can be gripped by the jaw assemblies 84.

A second bellcrank assembly 90 (Figs. 1 and 5), identical to the bellcrank assembly 60 and therefore not described in detail herein, is mounted in the spindle end portion 18 on the opposite ends 92 of the shafts 72. A cover plate 94 on the spindle end portion 18 encloses the bellcrank assembly 90.

To insure centering of a workpiece in the spindle 14, a centering fork assembly 93, consisting of three identical centering forks 96 corresponding to the jaw assemblies 84, is mounted in the spindle end portion 20 on the pivot members 44. Each centering fork 96 has a curved head portion 98 which is of a shape such that when the head portions 98 for the three centering forks 96 are moved to their outermost positions, they form a circle which is concentric with the spindle bore 16. Each centering fork 96 also includes a rectangular shank portion 100 which is secured to the adjacent jaw assembly by a cap screw 101. Since the centering forks 96 are mounted on the jaw assemblies 84, they are movable radially of the spindle 14 in unison with the jaws. Each centering fork 96 is located relative to the adjacent jaw assembly 84 such that the jaw teeth are slightly closer to the spindle axis than the adjacent fork head 98 so that a workpiece gripped by the jaws does not rest on the centering forks.

A centering fork assembly 102 identical to the assembly 93 is mounted in the spindle end portion 18 and associated with the bellcrank assembly 90 so that it is movable in response to manipulation of the bellcrank assembly 90. The assembly 102 includes three centering forks 104, like the forks 96, which are mounted on pivot members 103 in the bellcrank assembly 90 that correspond to the pivot members 44 in the assembly 60. On actuation of the bellcrank assembly 90, the forks 104 are movable radially of the end portion 18 in guide grooves 105.

In the operation of the chuck 10, assume that the chuck is mounted in the head stock of the machine 12 as illustrated in Fig. 1 and that a workpiece such as a length of pipe is positioned in the bore 16 so that it is supported on the centering forks 96 and 104. The bearings 74 are supported in bearing rings 110 maintained in fixed positions in the head stock by retaining pins 112. Annular brake shoes 114 and 116 are secured to the spindle end portions 18 and 20 so that they engage the stationary bearing rings 110. The brake shoe 114 is mounted on screws 118 positioned in openings 120 in the cover plate 94 for the spindle end portion 18. Springs 122 in the openings 120 are compressed by set screws 124 so that they act on the screws 118 to force the brake shoe 114 against the adjacent stationary bearing ring 110. The force of the springs 122 is likewise transmitted through the spindle 14 so as to force the brake shoe 116 against the adjacent bearing ring 110.

A gear drive mechanism (not shown) is provided for rotating the ring gear 22 in opposite directions, referred to arbitrarily as forward and reverse directions. On rotation of the ring gear 22 in a forward direction, the cam plate 30 is rotated clockwise as viewed in Fig. 4. The action of the brake shoes 114 and 116 on the bearing rings 110 provides for a drag on the spindle 14 so that it trails the cam plate 30 and the track 38 is moved in a clockwise direction as viewed in Fig. 4 relative to the roller 40. Consequently, the roller 40 is moved radially inwardly of the spindle 14 to actuate the bellcrank mechanism 60 in the manner heretofore described so as to advance the jaw units 84 inwardly toward the workpiece. The extent of inward movement required of the jaw units 84 depends, of course, on the size of the pipe in the spindle bore 16. As soon as the toothed members 88 for the jaw units 84 engage the pipe, the spindle 14 rotates with the cam plate 30 so as to likewise rotate the workpiece. The drag exerted on the brake shoes 114 and 116 by the bearing rings 110 provides for a continuous tendency of the spindle 14 to trail the cam plate 30 and provide the necessary relative movement between the cam plate 30 and the spindle 14 for continuously urging the jaws 84 inwardly.

By virtue of the construction of the centering fork assemblies 93 and 102, a small workpiece cannot fall between the jaw units 84 and during travel of the jaw units 84 radially inwardly of the spindle 14, the centering fork assemblies 93 and 102 are operating to move the workpiece toward the axis of the spindle bore 16 concurrently with inward movement of the jaw units 84. The spaced relation of the centering fork assemblies 93 and 102 in a direction longitudinally of the spindle 14 provides a two-point support for the workpiece so that it will not tilt prior to gripping by the jaws.

To release the pipe from the jaw units 84, it is only necessary to discontinue and then reverse the direction of drive of the ring gear 22 so that the cam plate 30 is moved to a position in which the roller 40 is again positioned within the disk cavity 56. The engagement of the roller 40 with the disk 50 prevents the roller from again moving radially inwardly of the spindle 14 so as to also move the jaw units inwardly. By manually rotating the disk 50 one hundred and eighty degrees, it is apparent that rotation of the ring gear 22 in a reverse direction will likewise provide for clamping of a workpiece between the jaw units 84 and rotation in a forward direction will release the jaws 84.

Figure 6:
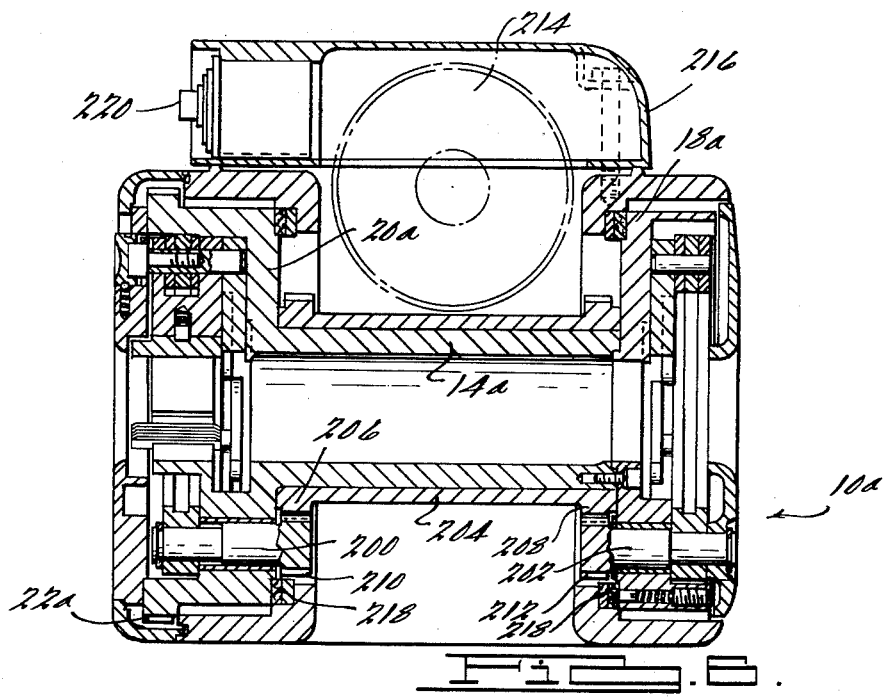
Fig. 6 is a longitudinal sectional view, like Fig. 1, of a modified form of the chuck of this invention.
Figure 7:
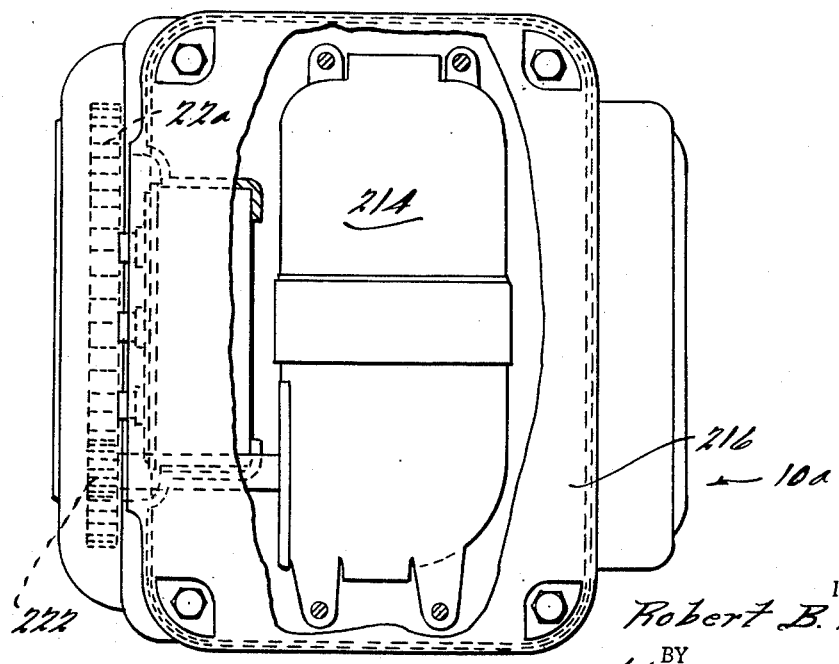
Fig. 7 is a plan view of the chuck shown in Fig. 6 with some parts broken away for the purpose of better illustrating the details of the chuck construction.

The modified chuck 10a illustrated in Figs. 6 and 7 is substantially identical to the chuck 10 except for the omission of the shafts 72. Like numerals with the letter suffix "a" are used therefore on the chuck 10a to indicate like parts on the chuck 10. In the chuck 10a, the shafts 72 are replaced by stub shafts 200 and 202, there being six stub shafts 200 and six corresponding shafts 202 which are axially aligned with the shafts 200. A sleeve 204, positioned about the spindle 14a between the end portions 18a and 20a thereof has flanged ends 206 and 208 which are formed with gear teeth that mesh with gears 210 and 212 on the stub shafts 200 and 202, respectively. This arrangement of the stub shafts 200 and 202 with the sleeve 204 provides additional space between the spindle end portions 18a and 20a which is occupied by the shafts 72 in the chuck 10. In the chuck 10a, a driving motor 214 is positioned in this space and is enclosed within a casing 216 which carries rings 218 that correspond to the bearing rings 110 in the chuck 10. A set of "forward," "reverse," and "off" control buttons 220 on the casing 216 control the operation of the motor 214 which drives a pinion gear 222 (Fig. 7) that in turn drives the ring gear 22a. Since the chuck 10a includes its own drive mechanism, it is portable for use at any desired location.

The chuck 10b illustrated in Figs. 8 and 9 is likewise portable and includes a main frame 300 having handles 302. The spindle, cam plate, bellcrank assembly and jaw unit arrangement, are substantially the same in the chuck 10b as previously described in the chuck 10. The spindle 14b in the unit 10b is, however, much shorter than the spindle 14 and includes only a single end portion 20b. The frame 300 has an opening 304 at one side which is aligned with the bore 32b in the cam plate 30b which is at the opposite side of the frame 300. A centering fork assembly 308 in the chuck 10b includes two groups of centering forks 310 and 311 which are spaced longitudinally of the spindle 14b and are identical to the forks 96 and 104 previously described. Each pair of forks 310 and 311 that are aligned longitudinally of the spindle are mounted on a clevis guide member 313 secured to the adjacent jaw unit 84b and slidably engaged with the frame 300. The centering forks 310 and 311 thus move radially of the spindle in unison with the jaws 84b. The chuck 10b has a ring gear 22b which meshes with a pinion (not shown) driven by a motor carried in a housing 316 secured to the frame 300. An annular brake shoe 315 on the spindle engages a stationary ring 317 on the frame 300. The operation of the chuck 10b is identical with the operation of the chuck 10 previously described.

Although the invention has been described with respect to a preferred embodiment thereof, it is to be understood that it is not to be so limited, since changes can be made therein which are within the scope of the invention as defined by the appended claims.

What is claimed is:

1. In a chuck, a spindle having a workpiece receiving opening extending therethrough, a plate member, co-acting track and roller means on said plate member and said spindle providing for movement of the roller means toward the axis of the opening in response to relative rotation of the plate member and the spindle, and jaw means connected to the roller means so as to be movable toward said axis on movement of the roller means toward said axis.

2. In a chuck, a spindle having a bore extending therethrough, plate means having a track formed therein and arranged eccentrically with respect to said bore, roller means movably mounted on the spindle and positioned in said track so that on movement along the track the roller means is moved radially with respect to the axis of said bore, jaw means connected to the roller means and guidably mounted on the spindle so that the jaw means is moved radially with respect to said axis in response to corresponding movement of the roller means, and means providing for relative rotation of said plate means and said spindle in response to rotation of the plate means.

3. In a chuck, a spindle having a bore extending axially therethrough and mounted for rotation about the axis thereof, a cam plate having a track formed therein and arranged eccentrically with respect to said axis, a roller mounted on the spindle for rotation therewith and for movement radially thereof, said roller being positioned in said track so that on movement along the track the roller is moved radially with respect to said axis, jaw means connected to the roller and mounted on the spindle so that the jaw means is moved radially with respect to said axis in response to corresponding movement of the roller, and means providing for relative rotation of said cam plate and spindle in response to rotation of the cam plate.

4. In a chuck, a spindle having a bore extending therethrough, plate means having a track formed therein and arranged eccentrically with respect to said bore, roller means movably mounted on the spindle and positioned in said track so that on movement along the track the roller means is moved radially with respect to the axis of said bore, a first jaw member connected to said roller and guidably supported on the spindle for movement radially thereof in response to corresponding movement of the roller, a second jaw member angularly spaced from said first jaw member and guidably supported on the spindle for movement radially thereof, means connecting said jaw members so that said second jaw member is movable radially inwardly when said first jaw member moves radially inwardly.

5. In a chuck, a spindle having a workpiece receiving opening extending therethrough, a plate member, co-acting track and roller means on said plate member and said spindle providing for movement of the roller means toward the axis of the opening in response to relative rotation of the plate member and the spindle, a plurality of jaw members guidably mounted on the spindle and arranged about said opening for concurrent in and out movement in directions substantially radially thereof and for rotation therewith, and means connecting said jaw members and said roller means so that the jaw members are movable in and out radially of the spindle in response to corresponding in and out movement of the roller means.

6. In a chuck, a spindle having a workpiece receiving opening extending longitudinally therethrough, a cam plate positioned at one end of said spindle and having a bore extending therethrough and arranged in a coaxial relation with said spindle opening, said cam plate having an eccentric track in the side thereof facing said spindle, a first bellcrank assembly comprising a plurality of connected bellcrank members pivotally mounted on said spindle adjacent said one end and arranged about said spindle opening so that on rotation of one bellcrank member in one direction all of said bellcrank members are rotated so that one end of each bellcrank member is moved toward said spindle opening, jaw members mounted on said spindle and connected to said bellcrank ends, a roller member connected to one of said bellcrank members and positioned in said track so that on movement thereof along the track in a direction such that the roller member is moved radially inwardly of the spindle said one bellcrank member is moved in said one direction, a ring gear secured to said cam plate, and means including a brake shoe for providing a drag on said spindle when the cam plate is rotated for providing for rotation of the cam plate relative to the spindle and a consequent movement of the roller member along the track.

7. In a chuck, a spindle having a workpiece receiving opening extending therethrough, a plate member, co-acting track and roller means on said plate member and said spindle providing for movement of the roller means toward the axis of the opening in response to relative rotation of the plate member and the spindle, jaw members arranged at angularly spaced positions about said workpiece opening and connected to the roller means so as to be movable toward said axis on movement of the roller means toward said axis, means connected to said plate member for rotating the plate member in one direction, and means engaging the spindle for exerting a drag on the spindle opposing rotation in said one direction for providing said relative rotation.

8. In a chuck, a spindle having a workpiece receiving opening extending longitudinally therethrough, a first bellcrank assembly comprising a plurality of connected bellcrank members pivotally mounted on said spindle and arranged about said spindle opening so that on rotation of one bellcrank member in one direction all of said bellcrank members are rotated so that one end of each bellcrank member is moved toward said spindle opening, a jaw member guidably mounted on said spindle and connected to said one end of some of said bellcranks, and means for actuating said bellcrank assembly so that said jaw members are movable inwardly of said spindle toward a workpiece therein.

References Cited in the file of this patent

UNITED STATES PATENTS

| | | |
|---|---|---|
| 1,429,395 | Barker | Sept. 19, 1922 |
| 1,442,107 | Vernaz | Jan. 16, 1923 |

FOREIGN PATENTS

| | | |
|---|---|---|
| 1,114,238 | France | Dec. 12, 1955 |